(12) United States Patent  
Waldron

(10) Patent No.: US 9,308,767 B1
(45) Date of Patent: Apr. 12, 2016

(54) BUSINESS CARD STAND FOR CELL PHONES

(71) Applicant: Keep It Business Cards, Inc., Melbourne, FL (US)

(72) Inventor: Thomas D. Waldron, Melbourne, FL (US)

(73) Assignee: Keep It Business Cards, Inc., Melbourne, FL (US)

( * ) Notice: Subject to any disclaimer, the term of this patent is extended or adjusted under 35 U.S.C. 154(b) by 169 days.

(21) Appl. No.: 14/175,559

(22) Filed: Feb. 7, 2014

Related U.S. Application Data

(60) Provisional application No. 61/840,923, filed on Jun. 28, 2013.

(51) Int. Cl.
*A47B 97/04* (2006.01)
*B42D 15/04* (2006.01)
*A47B 23/04* (2006.01)

(52) U.S. Cl.
CPC ............ *B42D 15/042* (2013.01); *A47B 23/044* (2013.01)

(58) Field of Classification Search
CPC ............... A47B 23/042; A47B 23/044; A47B 2220/0019; A47B 19/002; A47B 19/08; A47B 97/08; A47F 5/112; A47G 1/141
See application file for complete search history.

(56) References Cited

U.S. PATENT DOCUMENTS

| | | | |
|---|---|---|---|
| 903,050 | A | 11/1908 | Booth |
| 1,415,224 | A | 5/1922 | Dickmeyer |
| 2,600,429 | A | 6/1952 | Ranseen |
| 2,652,647 | A | 9/1953 | Suciu |
| 2,726,835 | A | 12/1955 | Hummel |
| 4,044,980 | A | 8/1977 | Cummins |
| 4,460,146 | A * | 7/1984 | Raggiotti ................. A47G 1/24 248/456 |
| D284,873 | S | 7/1986 | Smith |

(Continued)

OTHER PUBLICATIONS iBracket Card Stand Mount Holder for iPhone 4, 4S, 3G Smart Phone, 2013, retrieved from http://www.amazon.com/BLACK-iBracket-Stand-Holder-iPhone/dp/B007FOGF4E, 4 pages.

(Continued)

*Primary Examiner* — Cassandra Davis
(74) *Attorney, Agent, or Firm* — Brian S. Steinberger; Law Offices of Brian S. Steinberger, P.A.

(57) ABSTRACT

Card devices, apparatus and methods to convert generally rectangular shaped cards into stands and mounts for portable electronics, such as but not limited to portable phones, smart phone iPODS®, clocks, and cameras, pens, pencils, other business cards, or other documents, or photo frames. Business cards with indicial on both sides and having either perforated lines or narrow cut lines, that can be folded into a stand so that portable electronics devices can be safely supported on the stands. The business information indicia remains visible and readable on the stands by the user. The cards can have rear stand sections that can be folded outward to form a stand, and foldable lower edges to form a ledge or channel to support an edge of the portable electronics device.

14 Claims, 14 Drawing Sheets

(56) References Cited

U.S. PATENT DOCUMENTS

| | | | | |
|---|---|---|---|---|
| 4,674,724 A * | 6/1987 | Gaudet | ............... | A47B 23/044 248/459 |
| 4,722,504 A * | 2/1988 | Degenholtz | .......... | A47B 23/044 248/174 |
| 5,029,798 A * | 7/1991 | Clark | ............... | A47B 23/044 206/45.24 |
| 6,672,549 B2 * | 1/2004 | Kolb | ............... | B60R 11/0241 248/127 |
| 6,848,665 B1 | 2/2005 | Wu | | |
| D544,218 S | 6/2007 | Schelert | | |
| 7,260,907 B2 * | 8/2007 | Sturba | ............... | A45C 11/18 206/45.26 |
| RE40,266 E | 4/2008 | Chase | | |
| 7,527,235 B2 * | 5/2009 | Hummel | ............... | A47F 7/142 248/300 |
| 7,861,995 B2 | 1/2011 | Liou | | |
| D672,783 S | 12/2012 | Robinson | | |
| 8,656,616 B2 * | 2/2014 | Ashpole | ............... | B42D 15/02 273/317.5 |
| D720,010 S * | 12/2014 | Waldron | ............... | D19/91 |
| 2013/0026329 A1 | 1/2013 | Lane | | |

OTHER PUBLICATIONS

Black Ash iBracket Card Stand Mount Holder for iPhone 4, 4s, 3G Smart Phone, 2013, retrieved from http://www.amazon.com/BLACK-iBracket-Stand-Holder-iPhone/fp/B007FOGF4E, 1 page.

Black Ash iBracket Card Stand Mount Holder for iPhone 4, 4s, 3G Smart Phone, 2013, retrieved from http://www.amazon.com/BLACK-iBracket-Stand-Holder-iPhone/fp/B007FOGF4E, 4 pages.

* cited by examiner

FIG. 1
FIG. 2
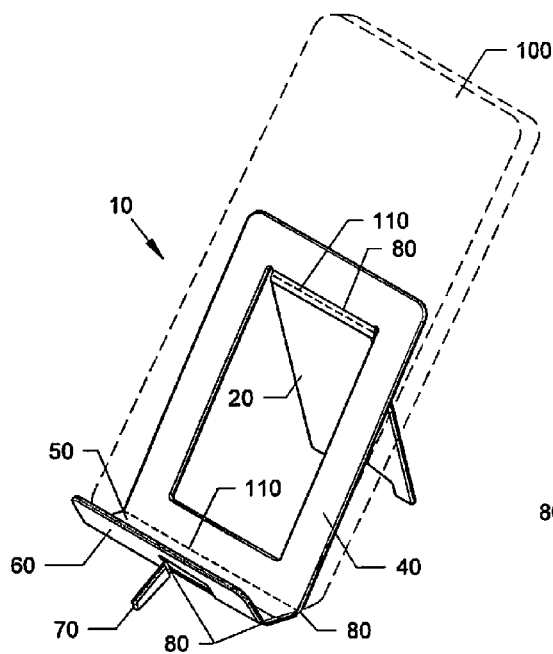
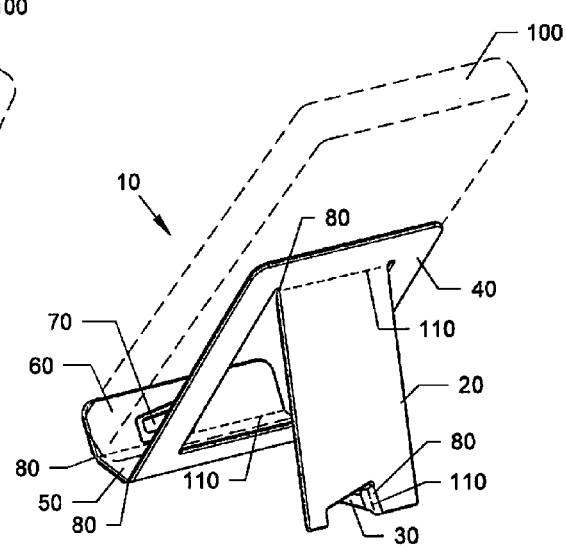

FIG. 3
FIG. 4
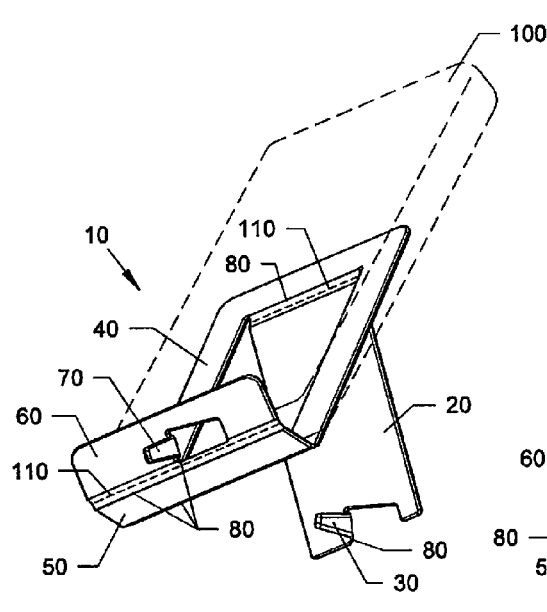
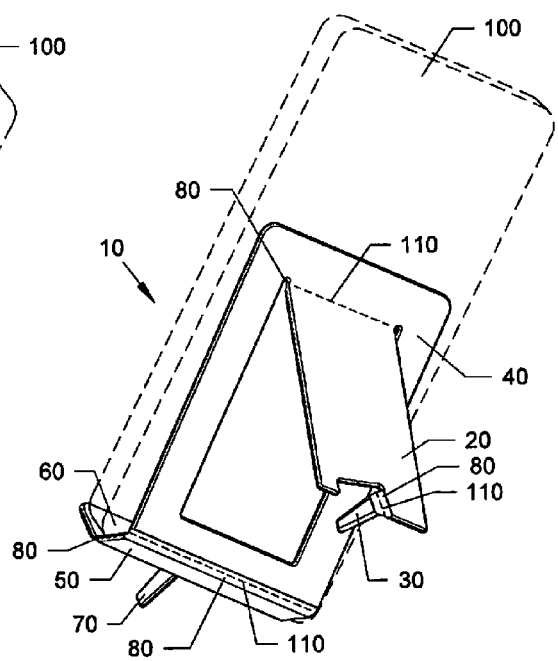

FIG. 5
FIG. 6
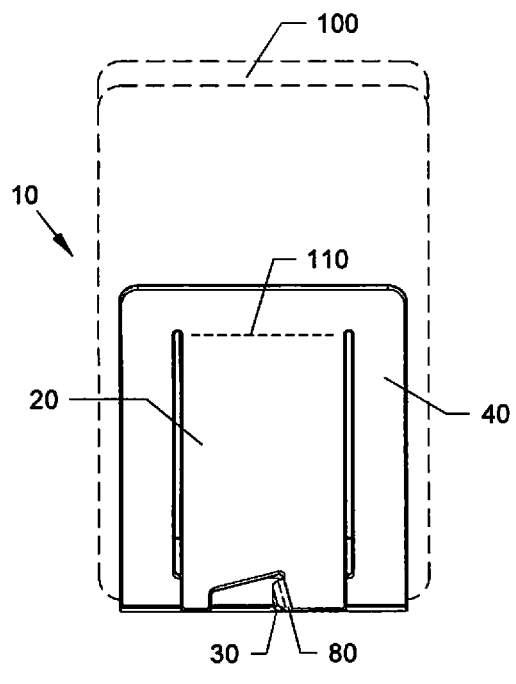
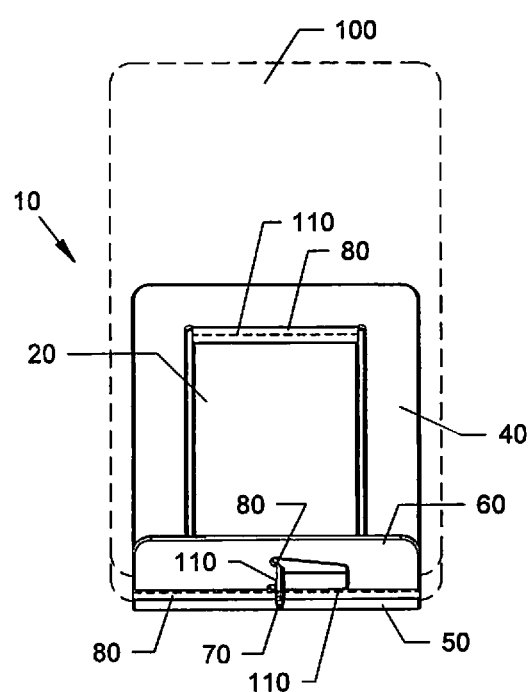

FIG. 7
FIG. 8
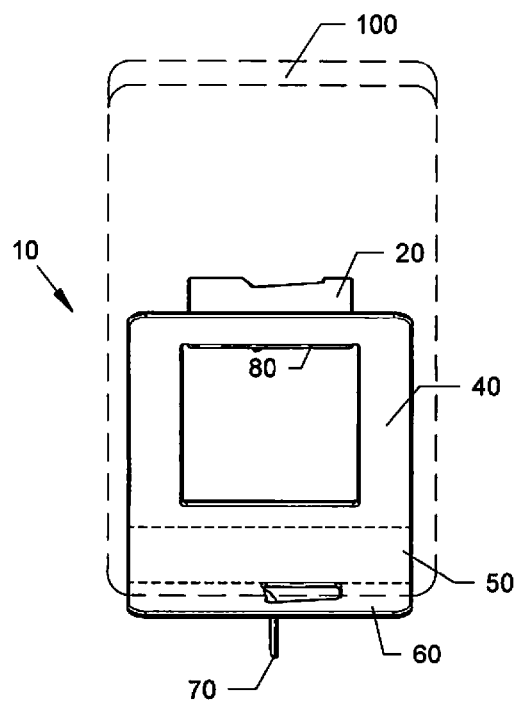
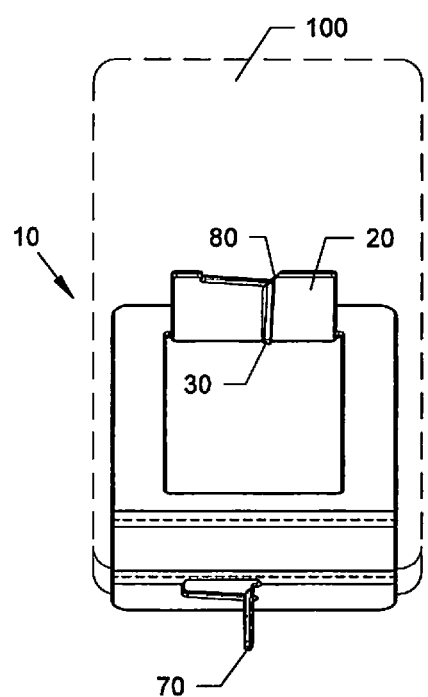

FIG. 9
FIG. 10
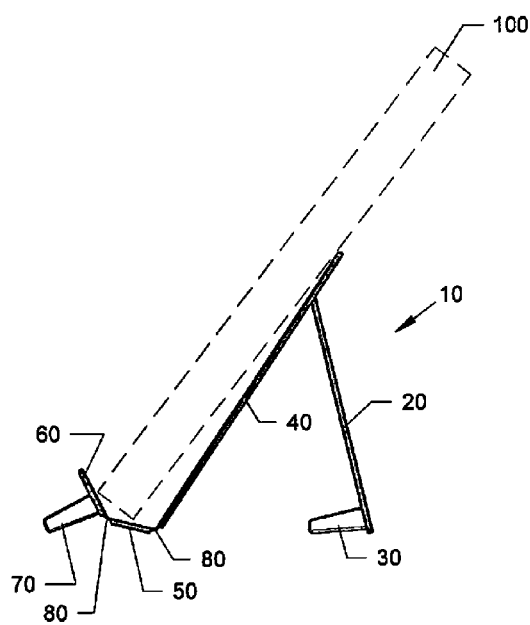
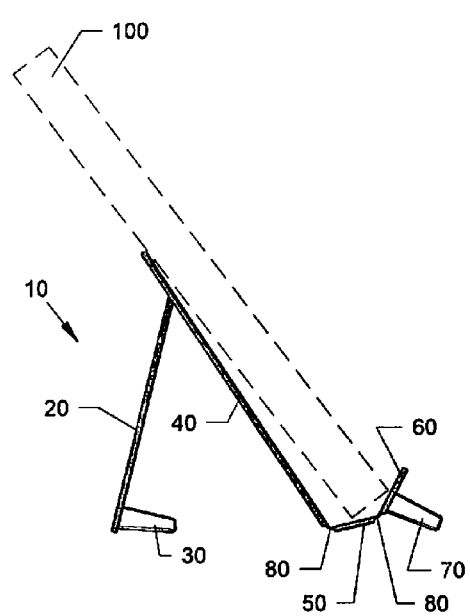

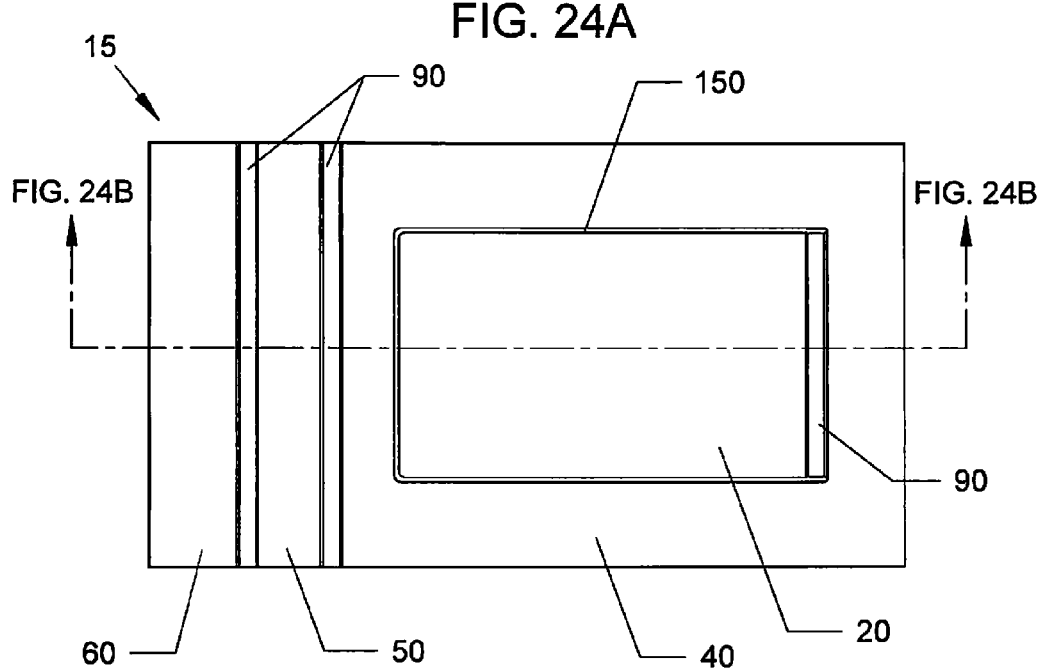
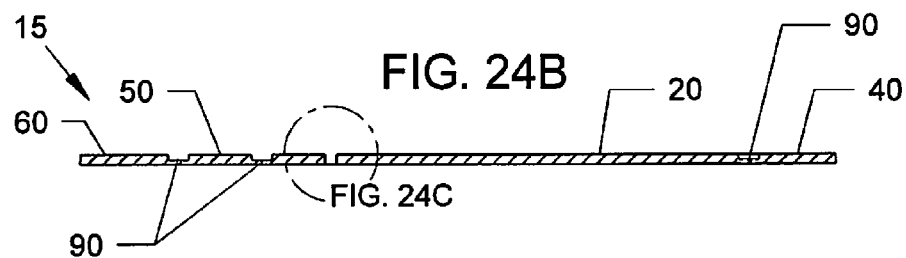
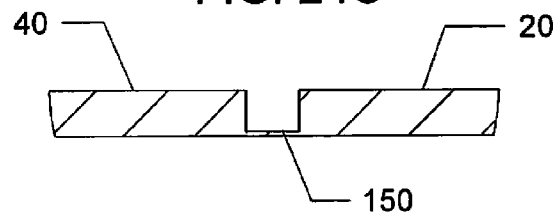

BUSINESS CARD STAND FOR CELL PHONES

This application claims the benefit of priority to U.S. Provisional Patent Application Ser. No. 61/840,923 filed Jun. 28, 2013, the entire application of which is incorporated by reference.

FIELD OF INVENTION

This invention relates to portable phone stands and business cards, and in particular to pop up business cards, devices, and methods to convert business cards, key cards, and loyalty cards by folding portions into stands and mounts for portable electronics devices, such as but not limited to portable phones, smart phones, iPADS®, clocks, cameras and the like.

BACKGROUND AND PRIOR ART

Business cards, key cards, and loyalty cards are commonly handed out and more often than not are commonly thrown out over time. As such, the information on the business card often becomes lost when the cards are disposed of.

Business card scanning machines exist but require the user have to insert the cards and upload information from the cards onto one's computer. Additionally, a smart phone can be used to take pictures of information on the card. However, again the actual card is disposed of after the information is scanned and saved. The user will have to later activate their computer, smart phone to access the information from the disposed card.

The iBracket® stand by Touratech shows a card shaped device that can be folded into a stand to support a smart phone, such as an iPhone®. However, this plastic type card requires multiple cut out slots throughout the middle of the card and along the outer side edges of the card. These cut out slots and cut out edges appear to be required so that the card can be folded and portions bent so it can be used as a stand to work. As such, business information cannot be located across all of the openings in the face of the card. Still furthermore, having to make substantial amounts of cut-outs can be difficult to manufacture and can add unnecessary extra expenses to the manufacturing costs, which would have to be passed down to the consumer. Additionally, the many portions of the card that are required to be removed would tend to weaken the strength of the stand itself, and can result in the stand collapsing and causing the phone to fall out and possibly damaged.

Thus, the need exists for solutions to the above problems with the prior art.

SUMMARY OF THE INVENTION

A primary objective of the present invention is to provide cards, devices and methods of converting business cards, key cards, and loyalty cards having readable indicia on one or both sides of the cards into stands for portable electronics devices, such as but not limited to portable phones, smart phones, iPADS®, clocks, cameras and the like.

A secondary objective of the present invention is to provide cards, devices and methods of converting business cards, key cards, and loyalty cards with indicia on one or both sides of the cards into stands for portable electronics devices, such as but not limited to portable phones, smart phones, iPADS®, clocks, cameras and the like, where the stands can be reconverted back into business cards where business indicia information on both sides of the card are readable.

A third objective of the present invention is to provide business cards, key cards, and loyalty cards, devices and methods of converting cards having photo images and/or personal information on one or both sides of the cards into stands for portable electronics devices, such as but not limited to portable phones, smart phones, iPADS®, clocks, cameras and the like.

A fourth objective of the present invention is to provide cards, devices and methods of converting cards having photo images and/or personal information on one or both sides of the cards into stands for portable electronics devices, such as but not limited to portable phones, smart phones, iPADS®, clocks, cameras and the like, where the stands can be reconverted back into business cards where business indicia information on both sides of the card are readable.

A convertible business card device, can include a business card having business information indicia on at least one side, a first elongated hinge line for allowing a midportion of the card to fold down into a rear stand, where a remaining portion of the card forms a frame surface, and a second elongated hinge line for allowing a lower edge of the card to bend up as a ledge, wherein business card is useful as a stand for a portable electronics device, which can be supported in a generally upright position by being placed on the bent up ledge, and a back of the portable electronics device is placed against the frame surface, and wherein the business information indicia remains visible and accessible to be viewed.

The convertible business card, key card, and loyalty card device can further include additional business information indicia on an opposite side of the card.

The first elongated hinge line and the second elongated hinge line can include arch shaped hinge lines.

The first elongated hinge line and the second elongated hinge line can include rectangular shaped hinge lines.

The first elongated hinge line and the second elongated hinge line can include cut lines.

The first elongated hinge line and the second elongated hinge line can include perforations.

The first elongated hinge line and the second elongated hinge line can include web punch-out lines.

The card can be formed from plastic. The card can be formed from cardboard. The card can be formed from metal.

The lower edge of the card can also include a third elongated hinge line parallel to the second elongated hinge line, and between the second elongated hinge line and the lower edge of the card, wherein folding along the third elongated hinge line forms a raised lower edge with a channel for supporting the lower end of the portable electronics device therein.

The rear stand can also include a smaller segment portion which is foldable into a brace for adding stability to the rear stand in the folded position.

The raised lower edge of the card can also include a smaller segment portion which is foldable into a brace for adding stability to the channel for supporting the lower end of the portable electronics device therein.

A novel method of converting a business card, key card, or loyalty card into a stand, can include the steps of providing a business card having business information indicia on at least one side of the card, providing a first hinge line along a midportion of the card to form a flap, folding down the flap to form a rear stand, where a remaining portion of the card forms a frame surface, providing a second hinge line on a lower edge of the card, bending up the lower edge of the card to form a ledge, and positioning a portable electronics device in a generally upright position with an edge of the device sitting on the bent ledge, and a back of the portable electronics device against the frame surface, wherein the business information indicia on the card remains visible and accessible to be viewed.

The method can further include the steps of providing a third hinge line on the lower edge of the card between the second hinge line and the lower edge of the card, bending up the lower edge of the card along the third hinge line, to form a channel between the folded second hinge line and folded third hinge line, and positioning the edge of the portable electronics device in the channel.

The method can further include the steps of providing a foldable a smaller segment portion in the rear stand, and folding the smaller segment portion into a brace for adding stability to the rear stand in the folded position.

The method can further include the steps of providing a smaller segment portion in the raised lower edge of the card, and folding the smaller segment into a brace for adding stability to the channel for supporting the lower end of the portable electronics device therein.

The card can be formed from plastic. The card can be formed from metal. The card can be formed from cardboard, any of which may be adhered to a magnetic strip or computer chip to record and or transmit additional data.

Further objects and advantages of this invention will be apparent from the following detailed description of the presently preferred embodiments which are illustrated schematically in the accompanying drawings.

BRIEF DESCRIPTION OF THE FIGURES

FIG. 1 is a front top perspective view of the novel business card converted into a stand supporting a portable electronics device in a generally upright position.

FIG. 2 is a rear top perspective view of the stand of FIG. 1.

FIG. 3 is a bottom front perspective of the stand of FIG. 1.

FIG. 4 is a bottom rear perspective of the stand of FIG. 1.

FIG. 5 is a rear view of the stand of FIG. 1.

FIG. 6 is a front view of the stand of FIG. 1.

FIG. 7 is a top view of the stand of FIG. 1.

FIG. 8 is a bottom view of the stand of FIG. 1.

FIG. 9 is a right side view of the stand of FIG. 1.

FIG. 10 is a left side view of the stand of FIG. 1.

FIG. 24A is a front view of the unfolded card stand of FIG. 23.

FIG. 24B is a side cross-sectional view of the unfolded card stand of FIG. 24A along arrows 24B.

FIG. 24C is an enlarged view of a web punch-out portions of FIG. 24A.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 Folding phone stand card deployed.
15 Folding phone stand card flat.
20 Support segment
30 Support segment brace.
40 Main structural segment.
50 Bottom segment.
60 Front segment.
70 Front segment brace.
80 Live plastic hinge. Arch configuration.
90 Live plastic hinge. Rectangle configuration.
100 Portable rectangular electronics device.
110 Imaginary hinge fold line.
120 Folding motion to deploy phone stand.
130 Business card information.
140 Promotional information.
150 Support segment web punch-out.
160 Broken web punch-out.

FIG. 1 is a front top perspective view of the novel business card converted into a stand 10 for supporting a portable electronics device 100. FIG. 2 is a rear top perspective view of the stand 10 of FIG. 1. FIG. 3 is a bottom front perspective of the stand 10 of FIG. 1. FIG. 4 is a bottom rear perspective of the stand 10 of FIG. 1. FIG. 5 is a rear view of the stand 10 of FIG. 1. FIG. 6 is a front view of the stand of FIG. 1. FIG. 7 is a top view of the stand 10 of FIG. 1. FIG. 8 is a bottom view of the stand 10 of FIG. 1. FIG. 9 is a right side view of the stand 10 of FIG. 1. FIG. 10 is a left side view of the stand 10 of FIG. 1.

Figure 11:
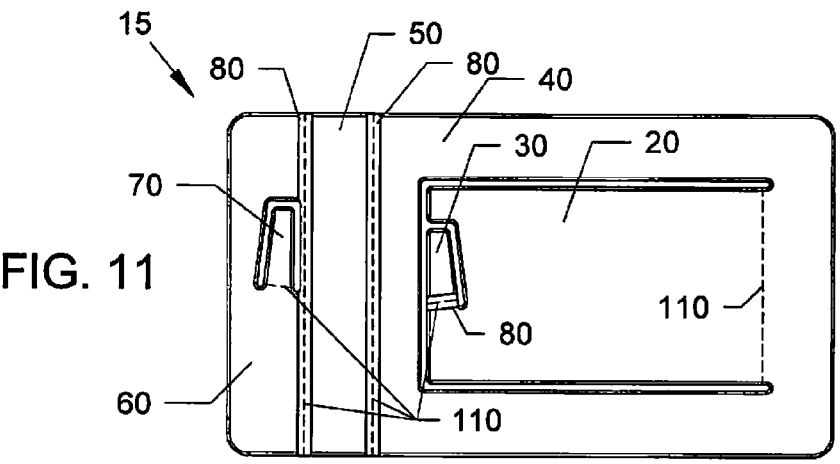
FIG. 11 is a top view of the business card used for the stand in an unfolded position.
Figure 12:
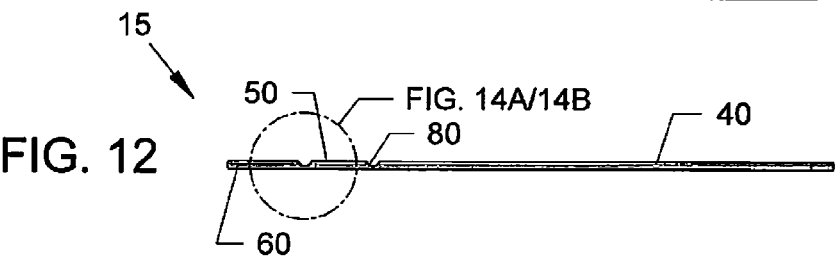
FIG. 12 is a side view of the unfolded business card of FIG. 11.
Figure 13:
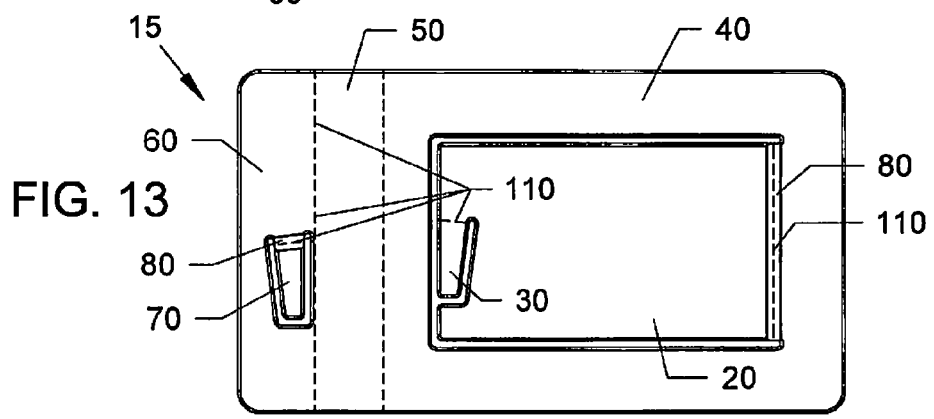
FIG. 13 is a bottom view of the unfolded business card of FIG. 11.
Figures 14A, 14B:
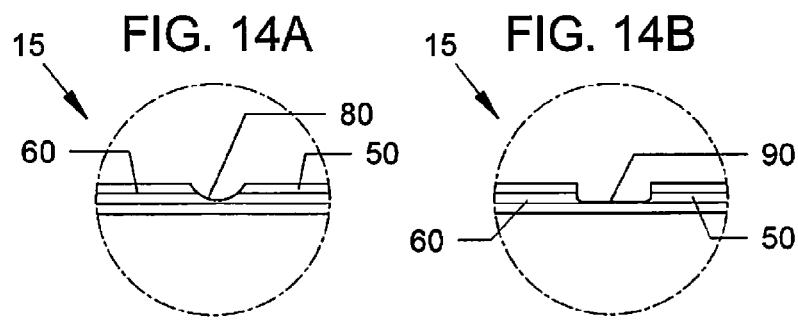
FIG. 14A shows an enlarged view of an arch hinge portion of the card of FIG. 12.
FIG. 14B shows an enlarged view of a rectangular hinge portion of the card of FIG. 12.
Figure 15:
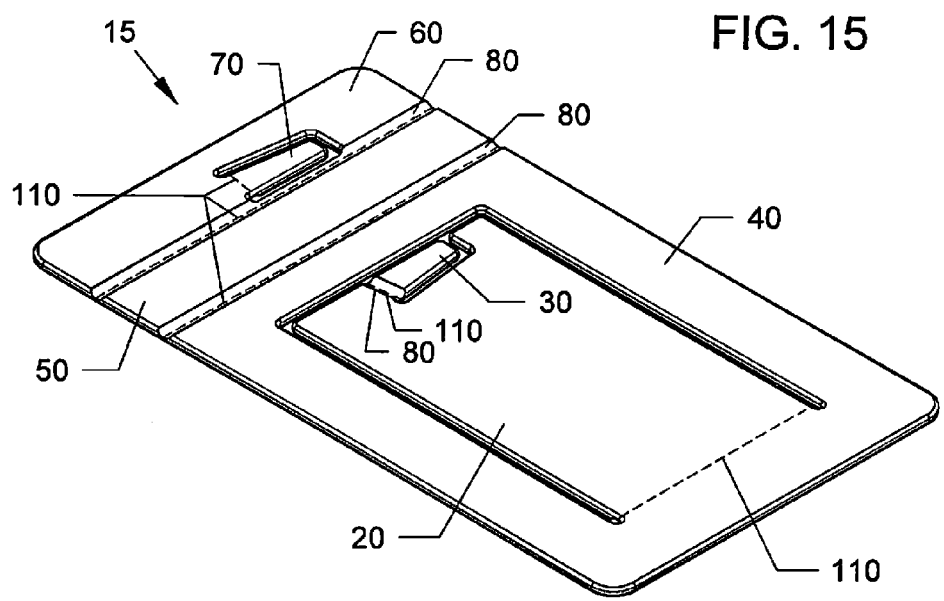
FIG. 15 is a top perspective view of the unfolded business card of FIG. 11.
Figure 16:
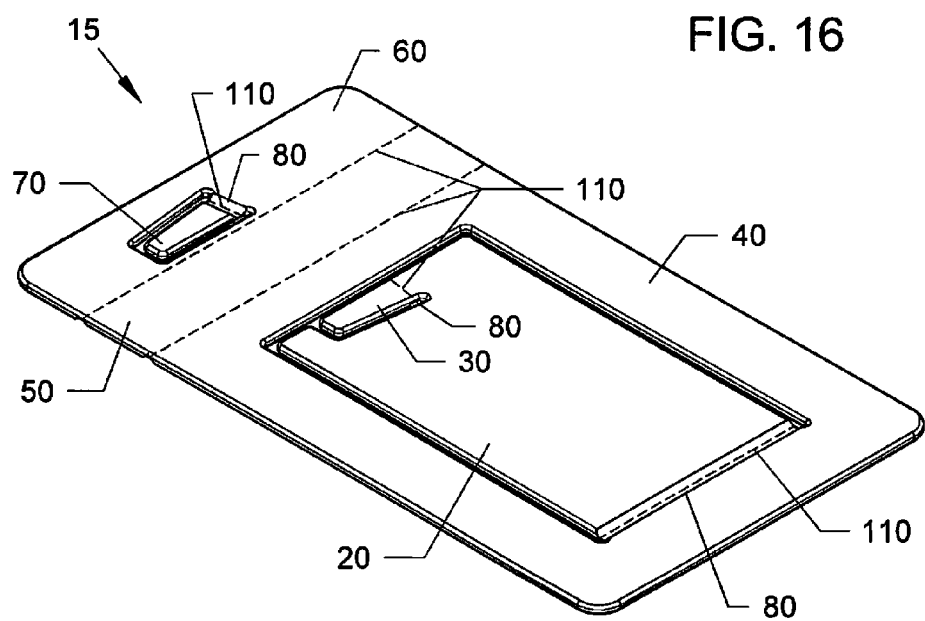
FIG. 16 is a bottom perspective view of the unfolded business card of FIG. 11.

FIG. 11 is a top view of the business card 20 used for the stand in an unfolded position 15. FIG. 12 is a side view of the unfolded business card 15 of FIG. 11. FIG. 13 is a bottom view of the unfolded business card 15 of FIG. 11. FIG. 14A shows an enlarged view of an arch hinge portion of the card 15 of FIG. 12. FIG. 14B shows an enlarged view of a rectangular hinge portion of the card 15 of FIG. 12. FIG. 15 is a top perspective view of the unfolded business card 15 of FIG. 11. FIG. 16 is a bottom perspective view of the unfolded business card 15 of FIG. 11.

Figure 17:
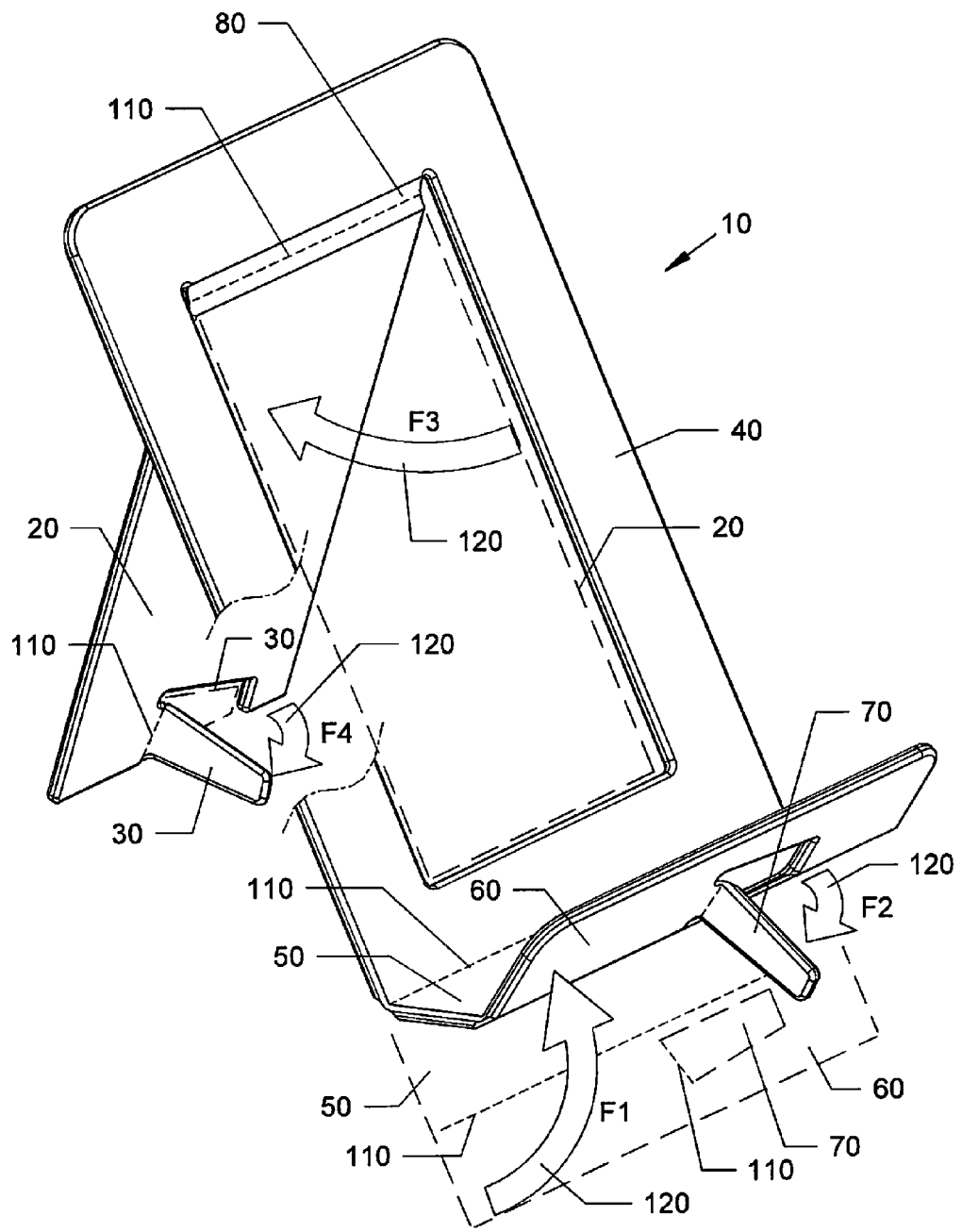
FIG. 17 is a perspective view of the business card of FIG. 11 with portions unfolded out to form a rear leg and a front ledge portions.
Figure 18:
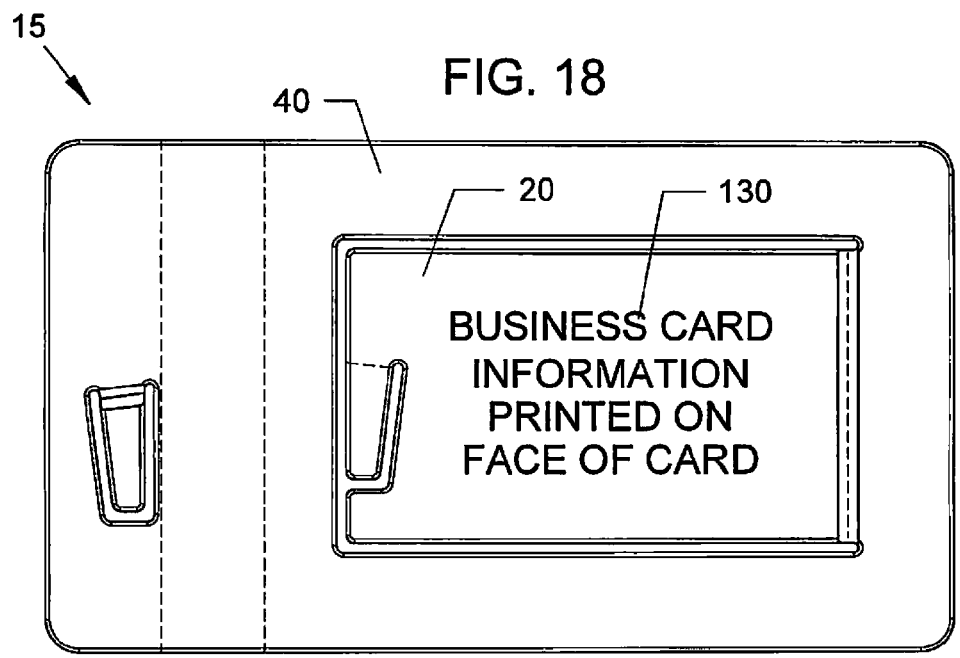
FIG. 18 is a bottom view of the unfolded business card of FIG. 11 with business card text.
Figure 19:
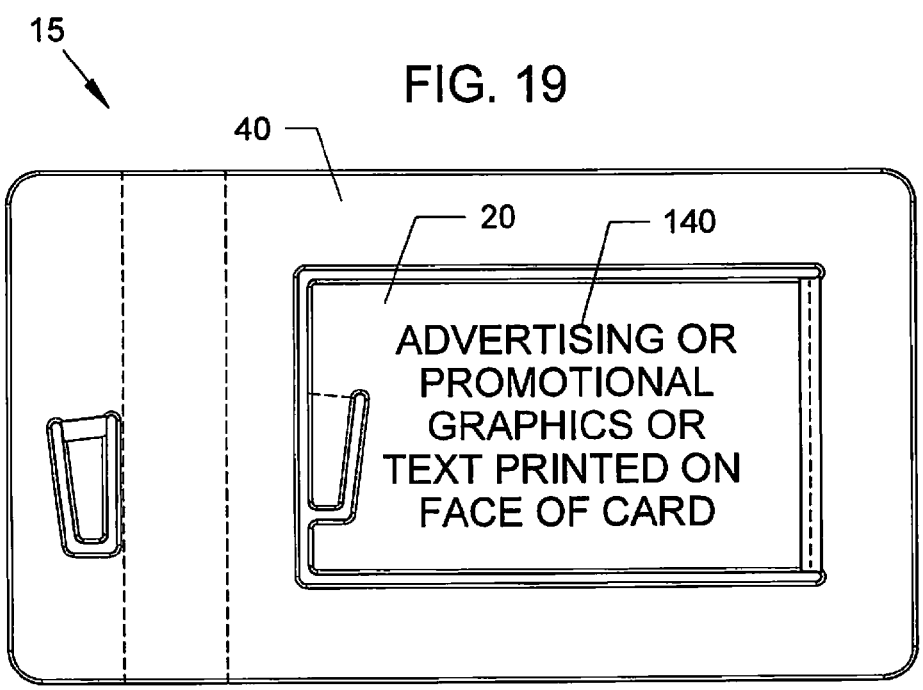
FIG. 19 is a bottom view of the unfolded business card of FIG. 11 with promotional information printed thereon.

FIG. 17 is a perspective view of the business card 10 of FIG. 11 with portions starting to unfolded out to form a rear leg and a front ledge portions. FIG. 18 is a bottom view of the unfolded business card 15 of FIG. 11 with business card text. FIG. 19 is a bottom view of the unfolded business card 15 of FIG. 11 with promotional information printed thereon.

Referring to FIGS. 11-19, the novel unfolded stand 15 can have the general shape of business card, being generally rectangular card shape, that can be formed from molded plastic, and the like. A top view of the unfolded stand card 15 can have a large main structural segment 40 having a rectangular shape separated from a smaller rectangular bottom segment 50, by an elongated groove. The elongated groove can have an arc configuration 80, or alternatively a rectangular configuration 90. The groove can be cut-out or alternatively, molded into the one side of the unfolded card 15. The bottom segment 50 can be separated from a front segment 60 by another elongated groove (having an arc configuration 80 or alternatively a rectangular configuration 90). The elongated grooves (80 or 90) can be used as hinges, which will be described later in more detail. Additionally, on the to view can be rectangular shaped support segment 20, with three sides cut-out in a middle portion of the main segment 40 with a hinge line 110 on one end. A generally smaller rectangular support segment brace 30 can be partially cut from the free end of the support segment 20, and be joined to the rest of the support segment 20 by another smaller length elongated groove (which can also be an arc shape, or alternatively, a rectangular shape 90). A smaller rectangular support segment can be cut-out along three out of four sides from an middle portion of the front segment 60.

On a bottom view of the unfolded card 15, be another elongated groove portion (which can also be an arc shape, or alternatively, a rectangular shape 90) connecting the support segment 20 to the main structural segment 40. Also, on the bottom view can be another generally smaller rectangular support segment 70 cut-out from a middle portion of the front segment 60, and joined at one end to the front segment 60 by another smaller length elongated groove (which can also be an arc shape, or alternatively, a rectangular shape 90). The opposite sides of the grooves generally form hinge fold lines 110.

Referring to FIGS. 1-10 and 17, the unfolded card 15 can be manipulated into a folded card stand 10, by several steps. With the unfolded card in a generally upright angled position with top view facing upward and front segment 60 toward ground level, the rectangular front segment 60 can be folded upward along the opposite side of the groove between the front segment 60 and bottom segment 50 in the direction of arrow F1. Simultaneously, rectangular bottom segment 50 can also be folded upward along the opposite side of the groove between the bottom segment 50 and the main segment 40 in the direction of arrow F1 (120).

Next, front segment brace 70 can be folded downward along the opposite side of a groove between the segment brace and a middle portion of the front segment 60 in the direction of arrow F2 (120).

Additionally, the rectangular support segment 20 can be folded back along an opposite side of the groove between the segment 20 and an interior portion of main segment 40 in the direction of arrow F3(120).

Next, support segment brace 30 can be folded forward along an opposite side of the groove between the brace 30 and a lower portion of the support segment 20 in the direction of arrow F4(120).

As shown in FIGS. 1-10, the bottom edge of a portable electronics device 100, such as but not limited to a portable phone, smart phone, IPOD®, clock, camera, and the like, can be positioned inside the channel formed by folded segment 60, bottom segment 50 and a lower portion of the main segment 40. The back of the portable electronics device 100 can rest against the top portions of main segment 40. The folded segment brace 30 and front segment brace 70 help stabilize the folded card to be used as a stand 10.

Referring to FIGS. 18-29, on one or both outer face sides (top view or bottom view) of the rectangular support segment 20 can have selected indicia 130 printed and/or engraved thereon, such as but not limited to advertising information, business information, identification information, and designs and/or logos.

When not being used as a support stand 15, the stand 15 can be unfolded back into a card shape 10 by reversing the folding steps referenced above.

Figure 20:
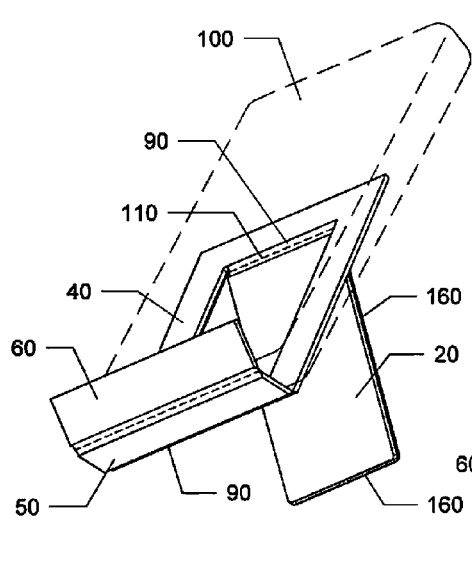
FIG. 20 is a bottom front perspective of another embodiment stand for supporting a portable electronics device in a generally upright position.
Figure 21:
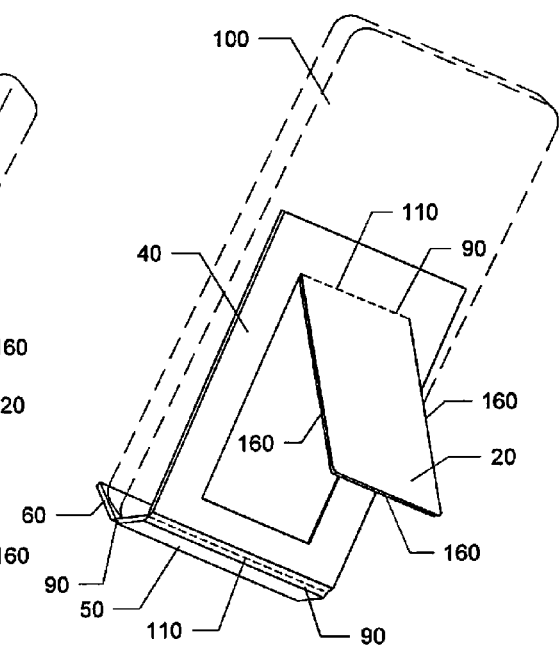
FIG. 21 is a bottom rear perspective view of the stand of FIG. 20.
Figure 22:
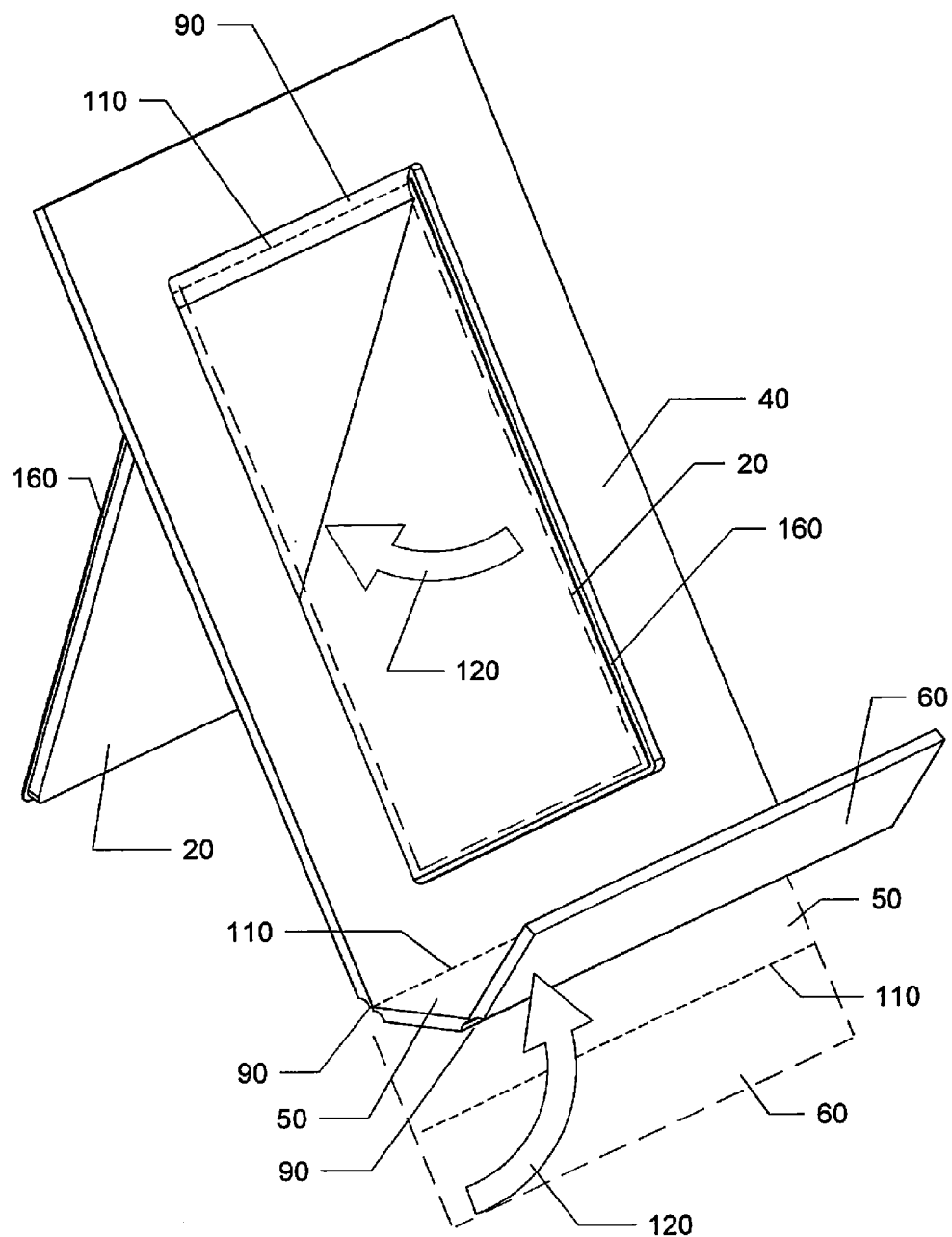
FIG. 22 is a front top perspective view of the stand of FIG. 20 with motion arrows showing folding motions. Unfolded segments are shown in dash line.
Figure 23:
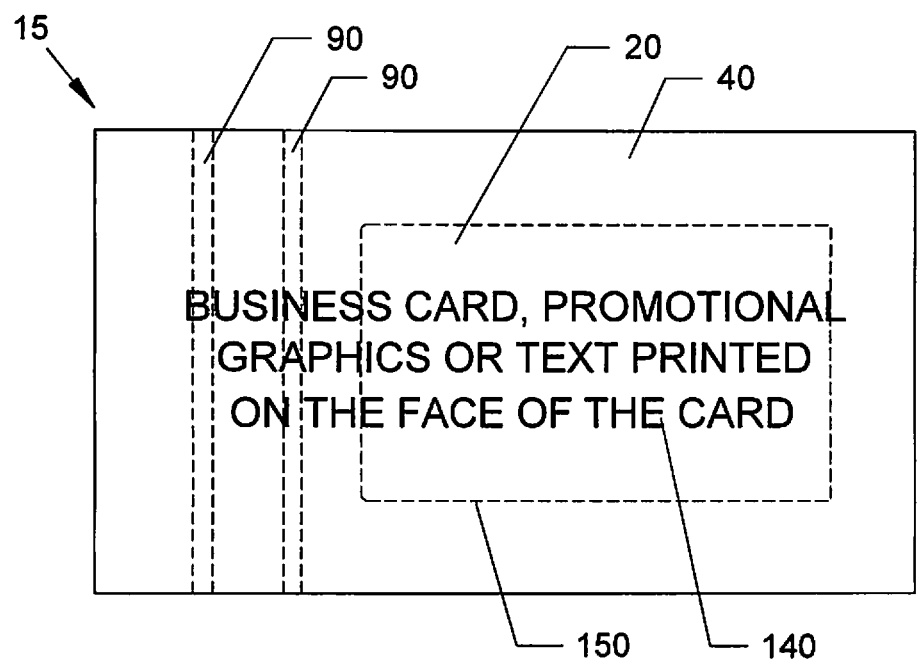
FIG. 23 is a rear view of the unfolded stand of FIG. 20 stand with indicia thereon.
Figure 25:
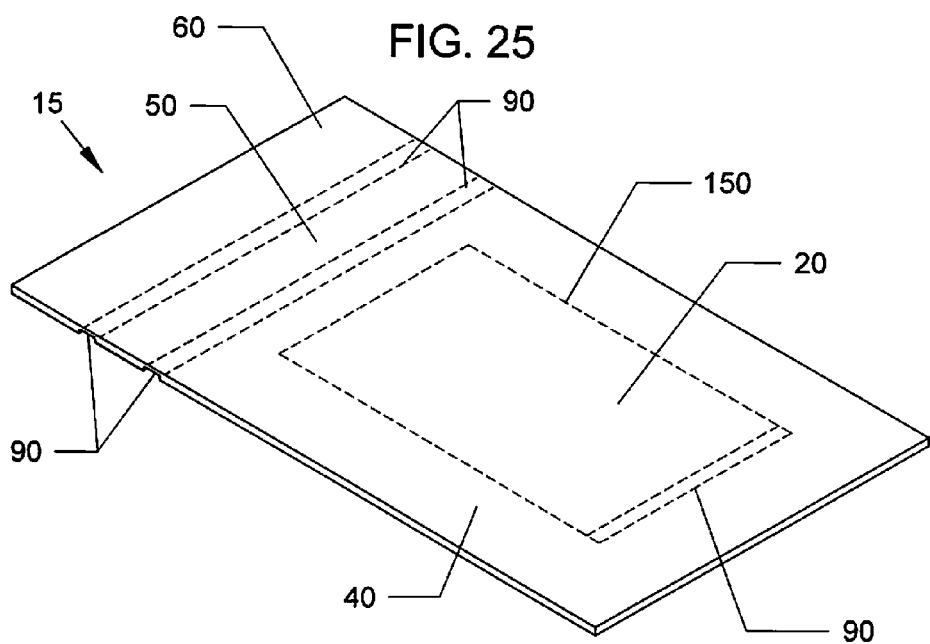
FIG. 25 is a rear perspective view of the unfolded card stand of FIG. 24A.
Figure 26:
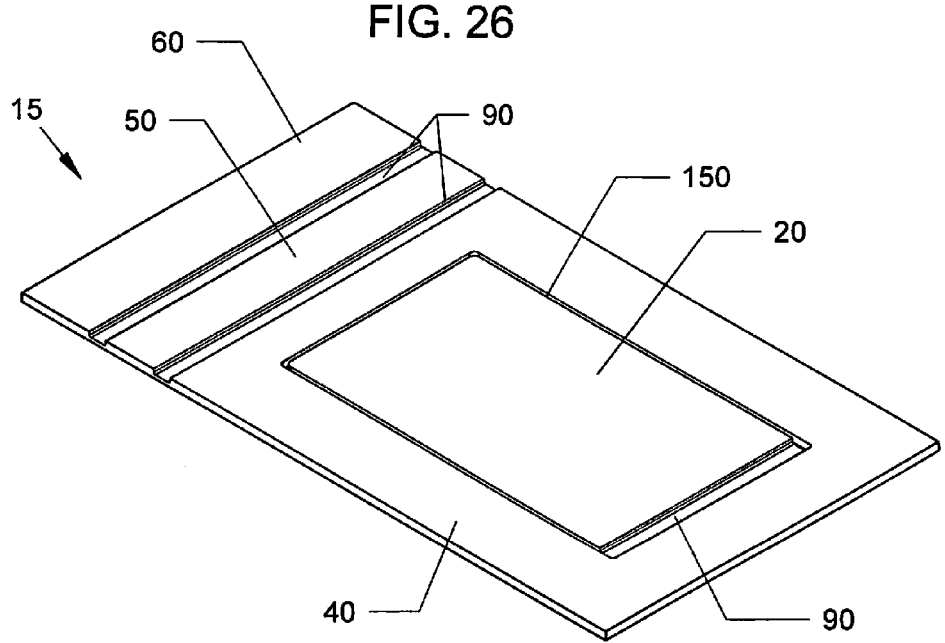
FIG. 26 is a front perspective view of the unfolded card stand of FIG. 24A.

FIG. 20 is a bottom front perspective of another embodiment stand with portable electronics device 100 supported thereon. FIG. 21 is a bottom rear perspective view of the stand of FIG. 20. FIG. 22 is a front top perspective view of the stand of FIG. 20 with motion arrows showing folding motions. Unfolded segments are shown in dash line. FIG. 23 is a rear view of the unfolded stand of FIG. 20 stand with indicia 140, such as but not limited to business information, promotional information, logos, designs, and the like, imprinted and/or engraved thereon. FIG. 24A is a front view of the unfolded card stand of FIG. 23. FIG. 24B is a side cross-sectional view of the unfolded card stand of FIG. 24A along arrows 24B. FIG. 24C is an enlarged view of a web punch-out portion 150 of FIG. 24A. FIG. 25 is a rear perspective view of the unfolded card stand of FIG. 24A. FIG. 26 is a front perspective view of the unfolded card stand of FIG. 24A.

Referring to FIGS. 20-26, this embodiment folds out in similar steps to the previous embodiment, with the exception of not requiring support segment brace 30 and front segment brace 70, and not having a pre-cut out of 3 out of the four side edges of the support segment 20 from a middle portion of the main segment 40. Here, three out of the four outer side edges of middle support segment 20 can have elongated web punch-out lines 150. The web punch-out lines 150 can be preformed into the card material as very thin sections of material that are designed to break away when the assembler wants to fold out the support segment 160 for the first time.

Similar to the previous embodiment, when it is desired for the invention to not be used as a support stand 15, the stand 15 can be unfolded back into a card shape 10 by reversing the folding steps referenced above.

In addition to the arch or rectangular shaped hinge/cut lines, the cards can include hinge/cut lines formed from perforations.

Additionally, the hinge lines can include different combinations of arc shapes, rectangular shapes, perforations, web punch-out portions, and the like, on one card.

The novel business cards, key cards, or loyalty cards can be formed from plastic, cardboard with or without waterproof coatings, metal, combinations thereof, and the like.

Other types of cards can include, but are not limited to modifying debit cards, credit cards, and the like, into the novel invention cards.

This pop up business card by the inventor can further be characterized by information printed on the card that supplies the picture of an individual, or information about a business such as name and contact information. Part of the manufacturing process has cut(s) through the card. Another part of the manufacturing process can have perforations in the card. If the user of the card follows the directions the card can be folded, bent, and or pushed wherein the card has been transformed into a tool. This tool can be used to support a cellular phone or smart phone at an angle enabling the viewer to better see the screen.

Thus the novel card has two distinct purposes, (1) to supply information about a person or business and (2) motivate the receiver of the card to keep the card as it can later be used and reused as a tool to support their phone. Larger versions of the card can be produced to hold tablets. Cards can be folded into place, used to support the phone or tablet and thereafter be folded flat again and stored in a small place until needed again.

One of the marketing principals is that the card(s) can be purchased as gifts. The purchaser can order the card(s) with personal photos of any type, school and/or sports team emblems, corporate logos, and of course, information customarily on business cards, displayed on the novel card, and then given away, used as a hotel key card or business loyalty card. The cards can be ordered through a website and desired indicia information, such as but not limited to business card information, pictures, images, and any other type of indicia can be uploaded to the site. Alternatively, the customer can customize the cards by selecting pre-existing indicia information available on the website. Additional marketing can take place through retail stores, kiosks and the like, as well as any other type of ordering and customizing process.

Because the card contains such pictures or information and can also pop up to be used as a smart phone holder, it is theorized that the recipients will be motivated to KEEP IT. Current marketing strategies include a comical warning to purchasers that Keep it Cards are highly prone to be stolen. "Careful, if someone sees it they might KEEP IT".

Two separate web sites can include KEEPITCARDS.com and KEEPITBUSINESSCARDS.COM. Keepitcards.com can be for all purchases other than business cards. Marketing on this site can also be comical and focusing on purchasers that want cards with pictures of pets, grandchildren, school or fraternity logos and colors, and the like. The novel cards can also be available preprinted with a large variety of generic photos appropriate for birthdays, holidays, Valentine's Day, and the like.

Keepitbusinesscards.com can be dedicated to the serious production of business cards, business logos.

Additional marketing can be accomplished by placing vending machines and/or kiosk in public locations where the purchaser can place a photo inside the vending machine and the photo will be copied on to a Keep it Card. The kiosks can include the capability of accessing a website for uploading indicia for the novel cards and/or selecting from indicia on the website.

Licensing agreements can be available wherein existing office supply stores will have the cards on hand and the ability to put any picture, and/or design and/or logo, and the like, the purchaser has on the card instantly at the store. The cards can also have selected sports team names, logos, and the like, imprinted thereon.

The novel cards can be easily converted into stands and mounts for portable electronics, such as but not limited to portable phones, smart phone iPODS®, clocks, cameras, as well as for supporting other objects, such as but not limited to pens, pencils, other business cards, or other documents, or photo frames.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A convertible business card device, comprising:
a business card having business information indicia thereon on at least, the card having a rectangular configuration with a top side and a bottom side and a left side and a right side, the card consisting of three parallel elongated foldable hinge lines, the three elongated foldable hinge lines being parallel to the top and the bottom of the card, the card having a front face and a rear face, the three parallel elongated foldable hinge lines consisting of a first elongated hinge line and a second elongated hinge line and a third elongated hinge line;
a folding midportion in the card, the folding midportion formed by a generally U-shaped cut consisting a left contiguous straight edge and a bottom contiguous straight edge and a right contiguous straight edge and a top edge forming the first elongated hinge line, wherein the first elongated hinge line allows for the midportion of the card to fold outward from the rear face of the card down into a rear stand with the bottom contiguous straight edge being supported on a surface, where a remaining portion of the front face of the card forms a frame surface;
the a second elongated hinge line for allowing the bottom side of the card to bend outward from the front face of the card as a ledge, wherein the business card is useful as a stand for a portable electronic device, which can be supported in a generally upright position by being placed on the bent up ledge with aback of the portable electronic device adapted to be placed against the frame surface: and
the third elongated hinge line located between the second elongated hinge line and the bottom side of the card, the third elongated hinge line being foldable upward as a raised lower edge forming a channel, and the channel assists in supporting a lower end of the portable electronic device.

2. The convertible business card device of claim 1, further comprising:
additional business information indicia on an opposite side of the business card.

3. The convertible business card device of claim 1, wherein the first elongated hinge line and the second elongated hinge line include arch shaped hinge lines.

4. The convertible business card device of claim 1, wherein the first elongated hinge line and the second elongated hinge line include rectangular shaped hinge lines.

5. The convertible business card device of claim 1, wherein the first elongated hinge line and the second elongated hinge line include cut lines.

6. The convertible business card device of claim 1, wherein the first elongated hinge line and the second elongated hinge line include perforations.

7. The convertible business card device of claim 1, wherein the first elongated hinge line and the second elongated hinge line include web punch-out lines.

8. The convertible business card device of claim 1, wherein the business card is formed from plastic.

9. The convertible business card device of claim 1, wherein the business card is formed from cardboard.

10. The convertible business card device of claim 1, wherein the business card is formed from metal.

11. A convertible business card device, comprising:
   a business card having business information indicia on at least one side;
   a first elongated hinge line for allowing a midportion of the card to fold down into a rear stand, where a remaining portion of the card forms a frame surface;
   a second elongated hinge line for allowing a lower edge of the card to bend up as a ledge, wherein business card is useful as a stand for a portable electronics device, which can be supported in a generally upright position by being placed on the bent up ledge, and a back of the portable electronics device is placed against the frame surface;
   a third elongated hinge line parallel to the second elongated hinge line, and between the second elongated hinge line and the lower edge of the card, wherein folding along the third elongated hinge line forms a raised lower edge with a channel for supporting the lower end of the portable electronics device therein; and
   a smaller segment portion on at least one of the rear stand and the raised lower edge, the smaller segment portion is foldable into a brace for adding stability to the card.

12. The convertible business card device of claim 11, wherein the rear stand includes:
   the smaller segment portion which is foldable into the brace for adding stability to the rear stand in the folded position.

13. The convertible business card device of claim 11, wherein the raised lower edge of the card includes:
   the smaller segment portion which is foldable into the brace for adding stability to the channel for supporting the lower end of the portable electronics device therein.

14. A convertible business card device, consisting of:
   a business card having business information indicia thereon, the card having a rectangular configuration with a top side and a bottom side and a left side and a right side, the card consisting of three parallel elongated foldable hinge lines, the three parallel elongated foldable hinge lines being parallel to the top and the bottom of the card, the card having a front face and a rear face, the three parallel elongated foldable hinge lines consisting of a first elongated hinge line and a second elongated hinge line and a third elongated hinge line;
   a folding midportion in the card, the folding midportion formed by a generally U-shaped cut having a left straight contiguous edge and a bottom straight contiguous edge and a right straight contiguous edge and a top edge forming the first elongated hinge line, wherein the first elongated hinge line allows for the midportion of the card to fold outward from the rear face of the card into a rear stand with the bottom straight contiguous edge being supported on a surface, where a remaining portion of the front face of the card forms a frame surface;
   the second elongated hinge line for allowing the bottom side of the card to bend outward from the front face of the card as a ledge, wherein the business card is useful as a stand for a portable electronic device, which can be supported in a generally upright position by being placed on the bent up ledge with a back of the portable electronic device adapted to be placed against the frame surface; and
   the third elongated hinge line located between the second elongated hinge line and the bottom side of the card, the third elongated hinge line being foldable upward as a raised lower edge with a channel, and the channel assists in supporting a lower end of the portable electronic device.

* * * * *